United States Patent [19]

Kehe et al.

[11] Patent Number: 4,774,134
[45] Date of Patent: Sep. 27, 1988

[54] LOW OXYGEN BARRIER TYPE PLASTIC CLOSURE WITH AN ADHERED GASKETING COMPOUND AND METHOD OF FORMING SAME

[75] Inventors: Alfred W. Kehe, Berkeley; John N. Banich, Sr., Chicago, both of Ill.

[73] Assignee: Continental White Cap, Inc., Northbrook, Ill.

[21] Appl. No.: 25,635

[22] Filed: Mar. 13, 1987

[51] Int. Cl.⁴ .................. B32B 15/08; B32B 27/06
[52] U.S. Cl. ............................. 428/335; 264/160; 427/211; 428/337; 428/341; 428/461; 428/463; 428/913
[58] Field of Search ............... 428/461, 332, 335, 341, 428/515, 518, 463, 913; 427/211; 264/160; 215/347

[56] References Cited

U.S. PATENT DOCUMENTS 4,310,578  1/1982  Katsura et al. ............... 428/461 X
4,695,503  9/1987  Liu et al. ...................... 428/461 X Primary Examiner—Thomas J. Herbert
Attorney, Agent, or Firm—Charles E. Brown; Charles A. Brown; Paul Shapiro

[57] ABSTRACT

A container closure formed from a thermoplastic polyolefin, e.g. polypropylene, which has been molded and adheres simultaneously to a coated foil, e.g. an aluminum insert, to which a conventional plastisol gasketing compound may be adhered to provide a hermetic container seal under hot fill and retort conditions. In order to facilitate adhesion to both the polypropylene closure panel and the PVC plastisol gasketing compound, a dead soft aluminum foil web was first coated on one side with an organosol utilizing a gravure coater, after which the coated web was passed through an oven. The partially coated web was then coated with a primer dispersion again utilizing a gravure coater, after which the coated web was passed through a second oven. A layer of polypropylene homopolymer was applied to the primer and inserts were die cut from the resultant web. The inserts were incorporated in a closure injection molding apparatus and a plastic closure injection molded thereabout. Thereafter a plastisol gasket compound was applied to the exposed surface of the insert and fused by convection and/or induction or dielectric heat.

13 Claims, 1 Drawing Sheet

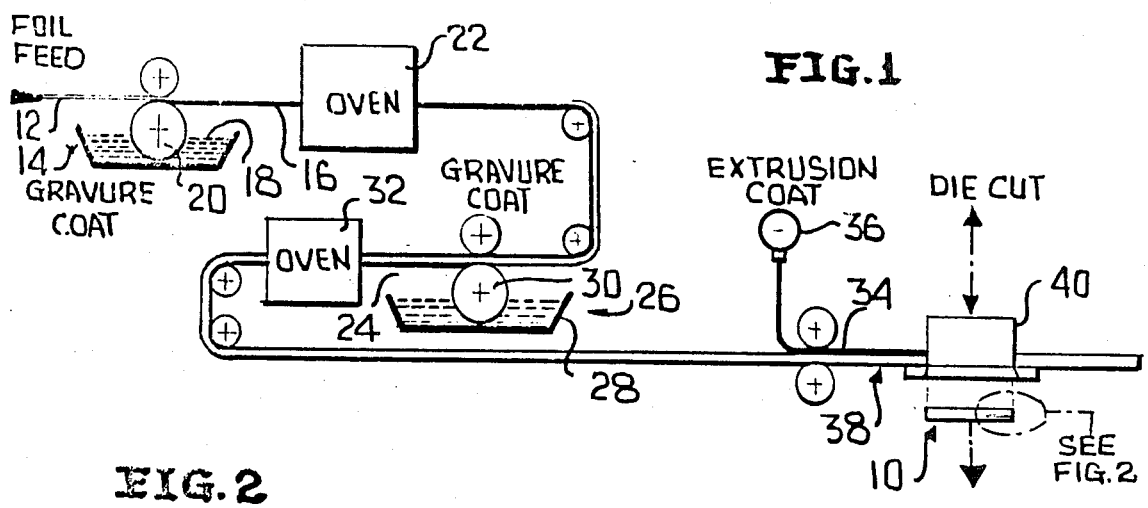
FIG. 1
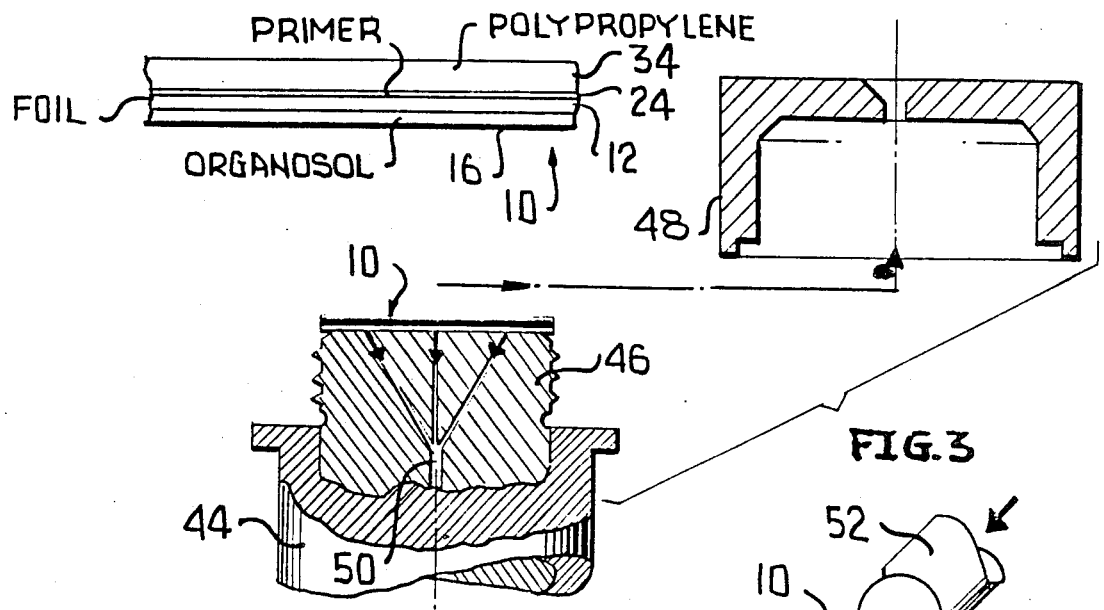
FIG. 2
FIG. 3
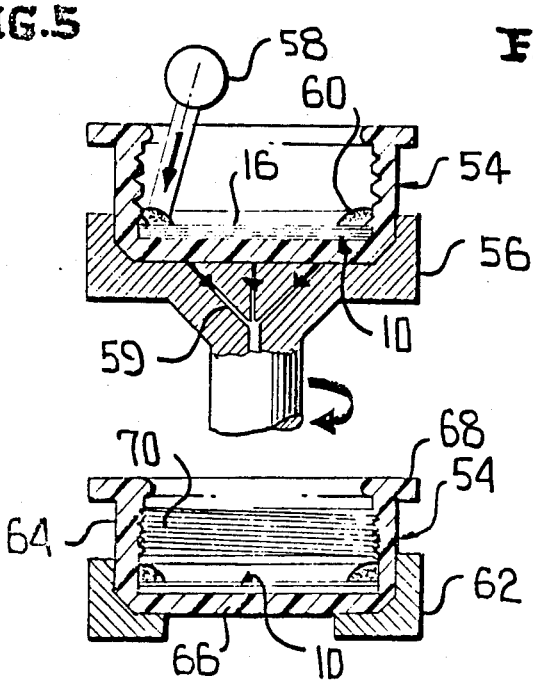
FIG. 5  FIG. 4
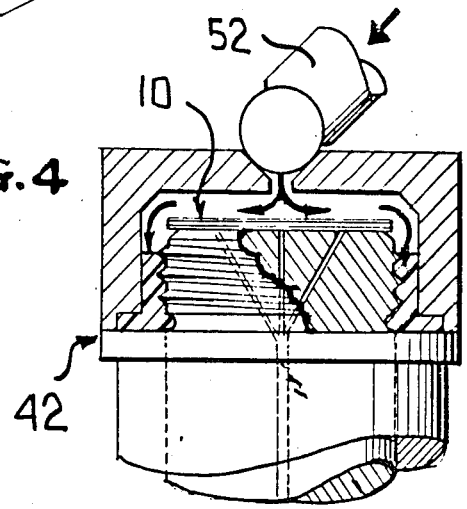
FIG. 6

LOW OXYGEN BARRIER TYPE PLASTIC CLOSURE WITH AN ADHERED GASKETING COMPOUND AND METHOD OF FORMING SAME

This invention relates in general to new and useful improvements in closures for a bottle or the like, and more particularly to a plastic/metal composite closure which includes a plastic closure molded and adhered simultaneously to a coated foil insert to which a conventional plastisol gasketing compound may be adhered to provide a hermetic container seal.

The primary object of this invention is to provide a lidded, lugged or threaded type composite closure for vacuum or pressure type products requiring very low orders of gas and/or liquid permeation with a functional hermetic seal.

Another object of this invention is to provide a foil lined plastic closure which will maintain a hermetic seal under pasteurization, hot fill and retort conditions.

Still another object of the invention is to provide a barrier metal foil closure panel insert which will simultaneously adhere to a polyolefin closure during the actual injection molding operation and subsequently adhere to a conventional PVC based plastisol gasekting compound spun-lined and fused within the closure.

Most particularly, there is a need in the plastic closure art for a plastic closure with functional performance characteristics in regard to very low orders of gas permeation, gasket sealant adhesion, and cut-through resistance under hot fill and retort conditions. Additionally, the closure should provide long term shelf life to the packaged product.

With the above and other objects in view that will hereinafter appear, the nature of the invention will be more clearly understood by reference to the following detailed description, the appended claims, and the several views illustrated in the accompanying drawing.

BRIEF DESCRIPTION OF THE DRAWING

FIG. 1 is a schematic view showing the method of forming a barrier metal foil closure panel insert in accordance with this invention.

FIG. 2 is an enlarged fragmentary elevational view of the insert showing the general details thereof.

FIG. 3 is an exploded perspective view with parts in section of a mold for injection molding a plastic closure about the insert.

FIG. 4 is an elevational view with parts in section of the closed mold of FIG. 3 and shows a plastic closure being injection molded.

FIG. 5 is an elevational view with parts broken away and shown in section of an apparatus for spin-lining the composite closure with a plastisol gasketing compound.

FIG. 6 is a schematic elevational view with parts broken away and shown in section of the plastisol gasketing material being fused.

Referring now to the drawings in detail, reference is first made to FIG. 1 wherein there is illustrated the method of forming the barrier metal foil closure panel insert, which insert is generally identified by the numeral 10. In accordance with this invention, there is provided a metal foil web 12 which is preferably in the form of a dead soft aluminum foil having a thickness on the order of 1.5 mil.

The web 12 is conveyed through a direct gravure coating apparatus, generally identified by the numeral 14, wherein a coating 16 is applied to one face or surface of the web 12. In accordance with this invention, the coating 16 is preferably applied as a solvent based 50% solids phenolic/vinyl chloride copolymer organosol identified by the numeral 18 with the gravure coating apparatus using a 65 line gravure cylinder 20.

The coated web is then passed through an oven 22 which is maintained at an air temperature on the order of 232° C. with the oven dwell time being on the order of 27 seconds. The weight of the dried coating 16 is on the order of 7.38 lbs./ream or 7.7 mg/in.$^2$.

The other face or surface of the web 12 is provided with a coating 24 utilizing a direct gravure coating apparatus generally identified by the numeral 26. The coating apparatus 26 applies a solvent based 12% solids polyolefin carboxylic acid copolymer primer dispersion 28 which may include polyethylene or polypropylene copolymers and homopolymers to form the coating 24. The coating apparatus 26 includes a 65 line gravure cylinder 30. The coated web 12 is then passed through an oven 32 having an air temperature on the order of 450° F. with an oven dwell time on the order of 20 seconds. The resultant dried coating 24 has a film weight on the order of 1.60 lbs./ream or 1.68 mg/in.$^2$.

Next, there is applied to the coating 24 a layer 34 of a thermoplastic polyolefin, preferably polypropylene homopolymer. The layer 34 has a thickness on the order of 3 mil and is either applied as an extrusion coat utilizing an extruder 36 as shown in FIG. 1, or the layer 34 may be applied as a film to the coating 24 by conventional hot roll nip lamination at about 190° C.

The resultant composite web material, generally identified by the numeral 38, then passes into a die cutting apparatus 40 which die cuts from the composite web 38 the inserts 10.

Referring now to FIG. 2 in particular, it will be seen that in cross section, a typical insert 10 includes a central aluminum foil layer.

Each insert 10 is placed in an injection mold for a closure, the injection mold being generally identified by the numeral 42. The injection mold 42 is only schematically illustrated and includes a base 44 having an upwardly extending core 46 and a top mold member 48. The core 46 projects above the base and the insert 10 is seated thereon and held in place by a vacuum drawn through passages 50.

The core is particularly adapted to define internal threads on a resultant closure although the mold 42 may be constructed so as to provide the closure with lugs or other suitable retaining means.

After the mold 42 has been assembled with the insert 10 in place, the mold 42 is presented to an injection nozzle 52 through which a polyolefin e.g. polypropylene is injected into the mold cavity to form a polpropylene closure member generally identified by the numeral 54. It will be seen that in the injection molding of the closure member 54, not only is the insert 10 mechanically interlocked with the closure member 54, but also the polypropylene homopolymer layer 34 is heat bonded to the newly injected polypropylene. In this manner, the insert 10 becomes a fixed and bonded part of the closure 54 leaving exposed the organosol surface 16.

After the closing 54 has been found in the injection mold 42, the closure is mounted in a fixture 56 which is part of a spin-lining apparatus including a suitable dispensing gun 58.

The fixture 56 is preferably provided with vacuum passages 59 to retain the closure 54 in place during the spin application of a plastisol gasket 60. The gasket 60 may either be an annular gasket or an overall gasket and has a thickness in the range of 0.035 to 0.060 inch.

The coated closure 54 is then subjected to a convection and/or induction or a dielectric heating apparatus to effect a fusion of the gasket 60 and the bonding thereof to the organosol coating 16. Such a heating fixture is schematically shown in FIG. 6 and identified by the numeral 62.

It will be seen that the resultant closure member 54 includes a body 64 having an integral end panel 66 and generally a base lip 68. The insert 10 has the layer 34 thereof bonded to the end panel 66 and is further interlocked with the body 64 of the closure 54. The body 64, as illustrated, is provided with internal securing threads 70 although the body may be provided with other types of securing means, including lugs and the like.

Although only a preferred embodiment of the closure including an insert and the method of forming the insert and the overall closure have been specifically illustrated and described herein, it is to be understood that minor variations may be made in the invention so described and illustrated without departing from the spirit and scope of the invention as defined by the appended claims.

We claim:

1. An article comprising a barrier metal foil closure panel insert for a plastic closure, said insert including a layer of metal foil, a primer coating on one face of said metal foil layer, a plastic bonding layer bonded to said primer coating, and an organosol coating on an opposite face of said metal foil layer.

2. An insert according to claim 1 wherein said bonding layer is a thermoplastic polyolefin having a thickness on the order of 3 mil.

3. An insert in accordance with claim 1 wherein said metal foil layer is a dead soft aluminum foil.

4. An insert in accordance with claim 1 wherein said metal foil layer is a dead soft aluminum foil having a thickness on the order of 1.5. mil.

5. An insert in accordance with claim 1 wherein said primer is one to which a thermoplastic polyolefin will directly bond.

6. An insert in accordance with claim 1 wherein said primer is a solvent based 12% solids polypropylene carboxylic acid copolymer dispersion.

7. An insert in accordance with claim 1 wherein said primer is a solvent based 12% solids polypropylene carboxylic acid copolymer dispersion, and said plastic bonding layer is formed of polypropylene.

8. An insert in accordance with claim 1 wherein said primer is a gravure coated solvent based 12% solids polypropylene carboxylic acid copolymer dispersion.

9. An insert in accordance with claim 1 wherein said organosol is a solvent based 50% solids phenolic/vinyl chloride copolymer organosol.

10. An insert in accordance with claim 1 wherein said organosol is a solvent based 50% solids pheonolic/vinyl chloride copolymer organosol which can be heat bonded to a plastisol gasketing compound.

11. An inset in accordance with claim 1 wherein said organosol is a gravure coated solvent based 50% solids phenolic/vinyl chloride copolymer organosol.

12. An insert in accordance with claim 1 wherein said primer is a solvent based 12% solids polypropylene carboxylic acid copolymer dispersion having a film weight on the order of 1.68 mg/in.$^2$.

13. An insert in accordance with claim 1 wherein said organosol is a solvent based 50% solids phenolic/vinyl chloride terpolymer organosol having a film weight on the order of 7.7 mg/in.$^2$.

* * * * *